US009878602B1

(12) United States Patent
Prezecki, II et al.

(10) Patent No.: US 9,878,602 B1
(45) Date of Patent: Jan. 30, 2018

(54) EXTENDED RANGE SUN VISOR TRACK SYSTEM

(71) Applicant: FORD GLOBAL TECHNOLOGIES, LLC, Dearborn, MI (US)

(72) Inventors: Leonard Gus Prezecki, II, Ann Arbor, MI (US); Scott Holmes Dunham, Redford, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/333,221

(22) Filed: Oct. 25, 2016

(51) Int. Cl.
*B60J 3/02* (2006.01)

(52) U.S. Cl.
CPC ............. *B60J 3/0239* (2013.01); *B60J 3/026* (2013.01)

(58) Field of Classification Search
CPC ................................ B60J 3/0234; B60J 3/026
USPC ............................................ 296/97.11, 97.9
See application file for complete search history.

(56) References Cited

U.S. PATENT DOCUMENTS 2,978,274 A * 4/1961 Ordman ................ B60J 3/0234 296/97.11
3,403,937 A 10/1968 Quaine
5,529,367 A 6/1996 Van Order et al.
5,851,046 A 12/1998 Kalkman et al.
8,186,709 B2 * 5/2012 She ........................ B29C 70/74 264/241
2009/0079224 A1 * 3/2009 Osborne ............... B64D 45/00 296/97.11

FOREIGN PATENT DOCUMENTS

| | | | |
|---|---|---|---|
| GB | 2358846 | A | 8/2001 |
| JP | 0446822 | A | 2/1992 |
| JP | 09315148 | A | 12/1997 |

OTHER PUBLICATIONS

English Machine Translation of JP0446822A.
English Machine Translation of JP09315148A.

* cited by examiner

*Primary Examiner* — Joseph D. Pape
(74) *Attorney, Agent, or Firm* — Vichit Chea; King & Schickli PLLC

(57) ABSTRACT

An extended-range sun visor assembly for a vehicle includes an arcuate track adapted for mounting to a vehicle roof panel whereby a first track segment extends vehicle-rearwardly and a second track segment extends vehicle-inwardly. A sun visor panel is slidably mounted to the arcuate track. The assembly may further include a bezel adapted to attach to and overlay the arcuate track. The bezel may include an integrated grab handle, and is configured to capture a portion of a vehicle headliner between the arcuate track and the bezel. The first track segment is dimensioned to allow the sun visor panel to translate vehicle-rearwardly to block glare entering a vehicle side window portion adjacent a vehicle B-pillar trim element, and the second track segment is dimensioned to allow the sun visor panel to translate vehicle-inwardly to block glare entering a vehicle windshield central portion.

15 Claims, 3 Drawing Sheets

222
216
222
206
202
212
204
222
220
210
208
218
105

EXTENDED RANGE SUN VISOR TRACK SYSTEM

TECHNICAL FIELD

This disclosure relates generally to sun visors for motor vehicles. More particularly, the disclosure relates to an extended range sun visor assembly configured for a sliding movement to block glare through an extended range of glare intrusion areas.

BACKGROUND

It has long been known to equip a motor vehicle with sun visors to shade the eyes of the driver and front seat passenger from the glare of the sun coming through the windshield or side window of a motor vehicle. Many motor vehicles include sun visors that are pivotally mounted on individual stalks and manually pivoted on the stalks between a stowed position adjacent the motor vehicle headliner and one or more operating positions covering an upper portion of the windshield or side window.

Unfortunately, such sun visors have a limited range of motion and so provide glare protection over only a limited range of visor positions. In particular, most prior art sun visor designs provide little protection against glare entering through two intrusion areas: 1) the area between the visor edge and the rear view mirror outboard edge; and 2) when the sun visor is rotated 90 degrees to block glare entering through the vehicle side window, the area between the visor edge and the B-pillar trim.

Prior art solutions include additional parts or assemblies added to the sun visor which can be deployed by extending, unfolding, rotating out, etc. to provide glare protection in the above-described intrusion areas. Other solutions require clip on shades or other protectors requiring similar deployment actions. Such solutions, while potentially effective for their intended purposes, add cost and complexity to the manufacturing process. In turn, such add-on features are subject to breakage since manufacturers typically attempt to provide sun visors and add-ons that are as thin as possible to avoid the appearance of bulky parts. Thus, a need is identified in the art for improvements to prior art sun visor designs intended to provide an extended range of glare protection, particularly at hard-to-reach intrusion areas as described above.

To solve this and other problems, the present disclosure describes an extended-range sun visor track system providing an extended range of protection from glare.

SUMMARY

In accordance with the purposes and benefits described herein and to solve the above-summarized and other problems, in one aspect an extended-range sun visor assembly for a vehicle is provided, comprising an arcuate track adapted for mounting to a vehicle roof panel whereby a first track segment extends vehicle-rearwardly and a second track segment extends vehicle-inwardly. A sun visor panel is slidably mounted to the arcuate track. The assembly further includes a bezel adapted to attach to and overlay the arcuate track. The bezel may be adapted to capture a portion of a vehicle headliner between the arcuate track and the bezel. In embodiments, the bezel includes an integrated grab handle.

In embodiments, the first track segment is dimensioned to allow the sun visor panel to translate vehicle-rearwardly to block glare entering a vehicle side window portion adjacent a vehicle B-pillar trim element. In embodiments, the second track segment is dimensioned to allow the sun visor panel to translate vehicle-inwardly to block glare entering a vehicle windshield central portion.

In other aspects, the present disclosure provides a carrier assembly for an extended-range vehicle sun visor, comprising an arcuate track and a bezel as described above. Vehicles including the extended-range sun visor assembly are described.

In the following description, there are shown and described embodiments of an extended-range sun visor assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification illustrate several aspects of the disclosed extended-range sun visor track system, and together with the description serve to explain certain principles thereof. In the drawing.

Reference will now be made in detail to embodiments of the disclosed extended-range sun visor assembly, examples of which are illustrated in the accompanying drawing figures wherein like reference numerals indicate like features.

DETAILED DESCRIPTION

Figure 1:
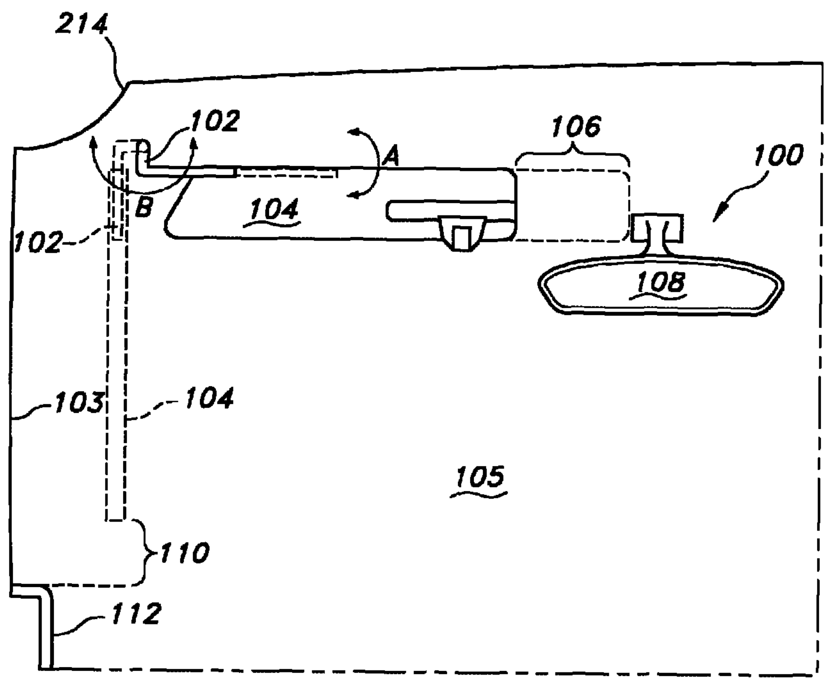
FIG. 1 depicts a vehicle equipped with a prior art sun visor assembly.

Preliminarily, it will be appreciated that directional terms used herein such as "forward," "rearward," "inboard," "outboard," and the like are intended to reference such directions relative to a vehicle. FIG. 1 depicts a representative prior art sun visor assembly 100. As shown therein, the typical such assembly 100 includes a pivot arm 102 mounted to a vehicle headliner and/or roof panel (not visible in this view), and a sun visor panel 104.

As is known, the sun visor panel 104 is configured to pivot around a longitudinal axis of the pivot arm 102 (arrow A) to translate the panel between a position substantially parallel to and flush with the headliner and a position substantially parallel to and flush with the vehicle windshield 105. The sun visor panel 104 can also pivot about the pivot arm 102 in an outboard direction (see arrow B) to position the sun visor panel adjacent a vehicle side window 103 to block glare entering the side window. As can be seen, there is an inboard gap 106 extending between an inboard end of the sun visor panel 104 and the windshield-mounted rear view mirror 108 (see dotted lines) which the sun visor panel cannot block. Likewise, when the sun visor panel 104 is pivoted to block glare entering through the vehicle side window 103, a rear gap 110 remains between a distal end of the sun visor panel and a vehicle B-pillar trim 112. Thus, glare can enter through those gaps and inconvenience the vehicle driver, passengers, etc.

Figure 2:
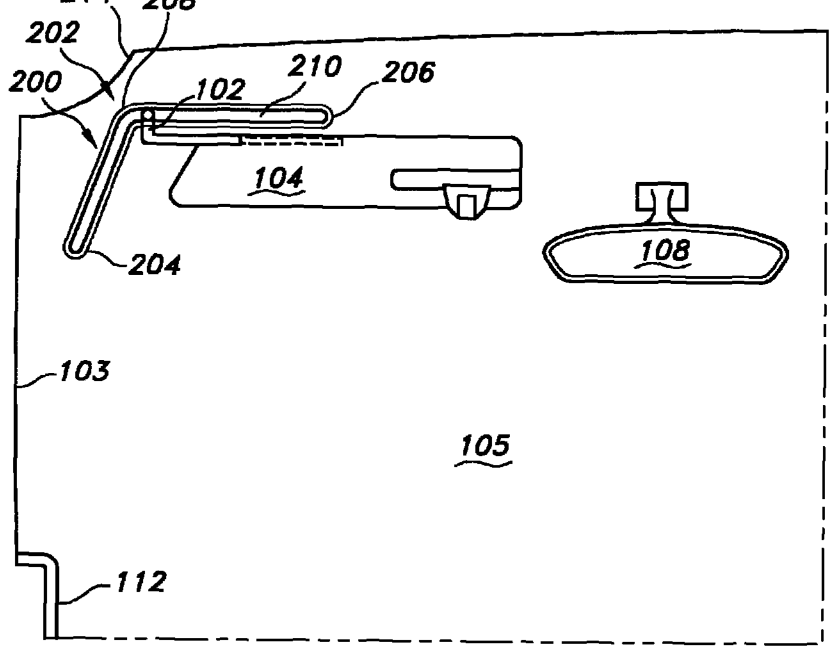
FIG. 2 depicts an extended-range sun visor assembly according to the present disclosure.

With reference to FIG. 2, the presently disclosed extended-range sun visor assembly 200 is provided to solve these and other problems. The extended-range sun visor assembly 200 includes a sun visor panel 104 mounted to a pivot arm 102, substantially as described above. The pivot arm 102 is slidably mounted to an arcuate track 202 which includes a first track segment 204, a second track segment 206, and an intermediate arcuate track segment 208. As will be described in greater detail below, the arcuate track 202 is configured to be mounted to a vehicle roof panel whereby the first track segment 204 extends rearwardly in the direction of the B-pillar trim 112, and the second track segment extends inboardly in the direction of the rear view mirror 108. The arcuate track 202 defines a guide slot 210 through which the pivot arm 102 and thereby the sun visor panel 104 can be translated inboardly and/or rearwardly.

Figure 3:
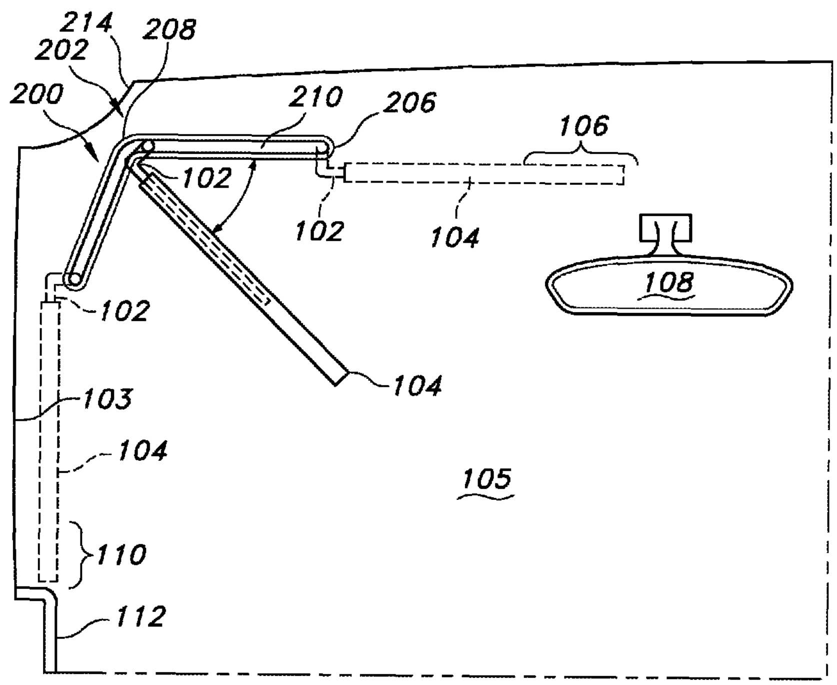
FIG. 3 depicts the extended-range sun visor assembly of FIG. 2 in use.

FIG. 3 illustrates this desirable range of motion for the extended-range sun visor assembly 200. As can be seen, the first and second track segments 204, 206 are dimensioned whereby the sun visor panel 104 can be translated inboardly and/or rearwardly sufficiently to block glare entering through the inboard gap 106 and the rear gap 110.

Figure 4:
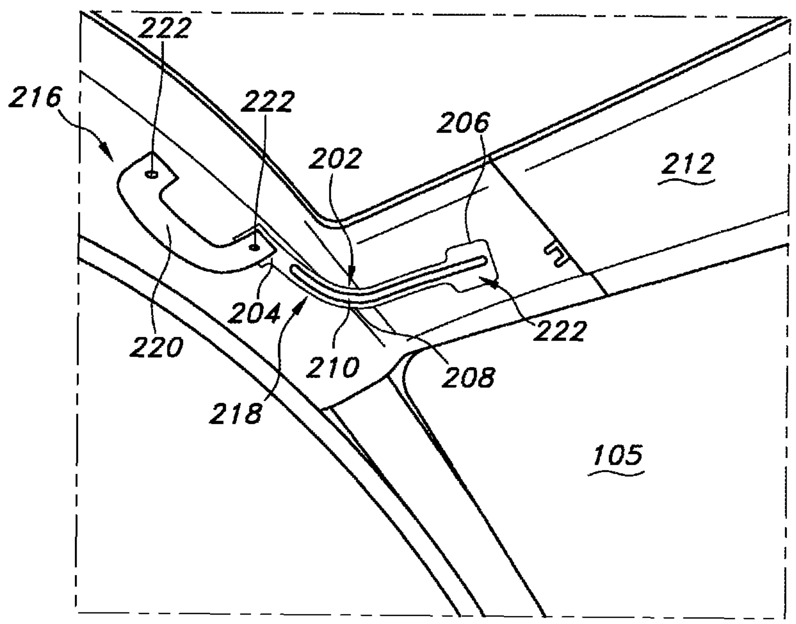
FIG. 4 depicts an arcuate track for use in the extended-range sun visor assembly, mounted to a vehicle roof panel.
Figure 5:
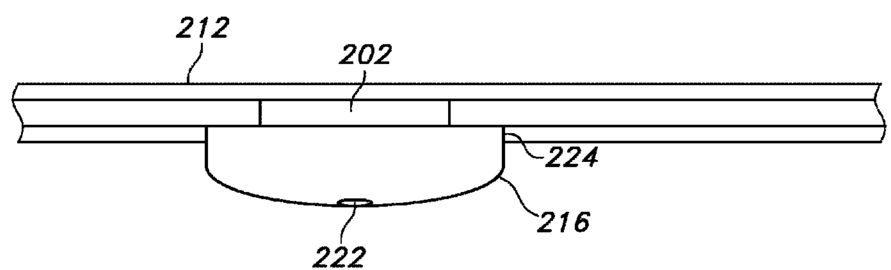
FIG. 5 shows a side view of the arrangement of FIG. 4.

With reference to FIG. 4 the arcuate track 202 is mounted directly to a vehicle roof panel 212, i.e. directly to the sheet metal. As depicted, the arcuate track segment 208 is substantially aligned with a vehicle A-pillar 214 whereby first track segment 204 extends rearwardly towards the B-pillar 112 (not shown) and the second track segment 206 extends vehicle inwardly, although alternative placements are contemplated.

A track bezel 216 is provided, configured to attach to and/or overlay the arcuate track 202. In the depicted embodiment, the bezel 216 includes a track-covering portion 218 and an integrated grab handle 220. The grab handle 220/track-covering bezel portion 218 may be attached at three locations 222 to control jounce requirements. However, alternative fastener placements are contemplated.

For installation, the arcuate track 202 is installed as described above, followed by installation of a vehicle headliner 224. Finally, the track bezel 216 is attached whereby a portion of the headliner 224 is captured between the track bezel and the arcuate track 202. This provides a clean execution and an attractive, aesthetically pleasing appearance to a user.

As will be appreciated, by the foregoing described features a simple, robust, and easy-to-operate extended-range sun visor assembly 200 is provided. By the described track system, glare from the sun passing through a wide portion of the vehicle windshield 105 may be blocked using only the standard sun visor blade, including glare passing through a difficult intrusion zones including a central portion of the windshield near an outboard edge of the rear-view mirror 108 (gap 106) which conventional sun visors typically cannot block. In turn, the assembly 200 allows blocking glare passing through the vehicle side window 103, and in particular blocking glare through the portion of the vehicle side window adjacent the B-pillar 112 trim (gap 110) which a conventional sun visor panel cannot block.

The described system is economical since no specialized sun visor panels or add-on components are required. Further, the described system allows the manufacturer to preserve sun visor panel 104 thickness, thus improving durability. Although such is not specifically illustrated herein, the skilled artisan will appreciate that a corresponding sun visor assembly 200 may be provided for both a driver's side and a passenger's side of the vehicle, thus providing the desirable extended-range sun visor for both sides of the vehicle windshield 105 and for both the passenger's and driver's side windows 103.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An extended-range sun visor assembly for a vehicle, comprising:

an arcuate track adapted for mounting to a vehicle roof panel whereby a first track segment extends vehicle-rearwardly and a second track segment extends vehicle-inwardly;

a sun visor panel slidably mounted to the arcuate track; and a bezel including an integrated grab handle wherein the bezel is adapted to attach to and overlay the arcuate track.

2. The assembly of claim 1, wherein the bezel is adapted to capture a portion of a vehicle headliner between the arcuate track and the bezel.

3. The assembly of claim 1, wherein the first track segment is dimensioned to allow the sun visor panel to translate vehicle-rearwardly to block glare entering a vehicle side window portion adjacent a vehicle B-pillar trim element.

4. The assembly of claim 1, wherein the second track segment is dimensioned to allow the sun visor panel to translate vehicle-inwardly to block glare entering a vehicle windshield central portion.

5. A vehicle including the assembly of claim 1.

6. A carrier assembly for an extended-range sun visor, comprising:

an arcuate track adapted for mounting to a vehicle roof panel whereby a first track segment extends vehicle-rearwardly and a second track segment extends vehicle-inwardly; and a bezel comprising an integrated grab handle, the bezel being adapted to attach to and overlay the arcuate track.

7. The assembly of claim 6, wherein the bezel is further adapted to capture a portion of a vehicle headliner between the arcuate track and the bezel.

8. The assembly of claim 6, wherein the first track segment is dimensioned to, when mounted to the vehicle roof panel, allow the extended-range sun visor to translate vehicle-rearwardly to block glare entering a vehicle side window portion adjacent a vehicle B-pillar trim element.

9. The assembly of claim 6, wherein the second track segment is dimensioned to, when mounted to the vehicle roof panel, allow the extended-range sun visor to translate vehicle-inwardly to block glare entering a vehicle windshield central portion.

10. A vehicle including the assembly of claim 6.

11. An extended-range sun visor assembly for a vehicle, comprising:

an arcuate track adapted for mounting to a vehicle roof panel whereby a first arcuate track segment extends vehicle-rearwardly and a second arcuate track segment extends vehicle-inwardly; and a sun visor assembly comprising a sun visor panel and a pivot arm slidably mounted to the arcuate track; and a bezel including an integrated grab handle and adapted to attach to and overlay the arcuate track.

12. The assembly of claim 11, wherein the bezel is configured to capture a portion of a vehicle headliner between the arcuate track and the bezel.

13. The assembly of claim 11, wherein the first track segment is dimensioned to allow the sun visor panel to translate vehicle-rearwardly to block glare entering a vehicle side window portion adjacent a vehicle B-pillar trim element.

14. The assembly of claim 11, wherein the second track segment is dimensioned to allow the sun visor panel to translate vehicle-inwardly to block glare entering a vehicle windshield central portion.

15. A vehicle including the assembly of claim 11.

* * * * *